United States Patent [19]

Tasaki et al.

[11] Patent Number: 4,956,721
[45] Date of Patent: Sep. 11, 1990

[54] METHOD OF FACSIMILE TRANSMISSION AFTER COLLECTION OF FACSIMILE CHARGE AND APPARATUS THEREFOR

[75] Inventors: Hisashi Tasaki; Kimikazu Endo, both of Kyoto, Japan

[73] Assignee: Omron Tateisi Electronics Co., Kyoto, Japan

[21] Appl. No.: 355,825

[22] Filed: May 22, 1989

Related U.S. Application Data

[63] Continuation of Ser. No. 884,559, Jul. 11, 1986, abandoned.

[30] Foreign Application Priority Data

Jul. 15, 1985 [JP] Japan .................. 60-154067
Jul. 15, 1985 [JP] Japan .................. 60-154070

[51] Int. Cl.$^5$ ............................. H04M 1/00
[52] U.S. Cl. .................. 358/402; 358/404; 358/463; 379/143
[58] Field of Search ............. 358/256, 257, 400, 434, 358/438, 443, 402, 468, 404; 379/100, 132, 143, 144, 155

[56] References Cited

U.S. PATENT DOCUMENTS

| Re. 32,115 | 4/1986 | Lockwood et al. | 235/381 |
| 2,356,116 | 8/1944 | Ridings | 358/257 |
| 2,692,910 | 10/1954 | Pye | 379/100 |
| 3,870,866 | 3/1975 | Halpern | 379/144 |

FOREIGN PATENT DOCUMENTS

| 55-107375 | 8/1980 | Japan | 379/144 |
| 56-60169 | 5/1981 | Japan | 358/400 |
| 69163 | 4/1983 | Japan | 358/257 |
| 138165 | 8/1983 | Japan | 358/257 |
| 60-239167 | 11/1985 | Japan | 379/132 |
| 61-154255 | 7/1986 | Japan | 379/144 |

*Primary Examiner*—Edward L. Coles, Sr.
*Attorney, Agent, or Firm*—Dickstein, Shapiro & Morin

[57] ABSTRACT

A facsimile transmitting system is provided, wherein information recorded on a document or docments is read and transmitted. Prior to transmission, the amount of information recorded on the document is detected. A charge is calcualted prior to transmission based on the detected amount of recorded information. Money or the like corresponding to the calculated charge is received. Thereafter, information read from the documents is transmitted. The money can be received via a charge receiving unit which responds to a card storing recorded monetary value. The receiving unit reads the value from the card, substracts a value corresponding to the calculated charge from the read value, and records the result of this subtraction onto the card. A transaction performing system is also provided having a receiving unit which receives article data relating to a physical article on which a transaction is to be performed, an input unit which inputs transaction data, a calculating unit for calculating a transaction charge based on the article data and the transaction data, a display unit for displaying the transaction charge, a receiving unit for receiving a monetary value corresponding to the transaction charge, and a unit for executing the transaction after receipt of the monteary value.

10 Claims, 17 Drawing Sheets

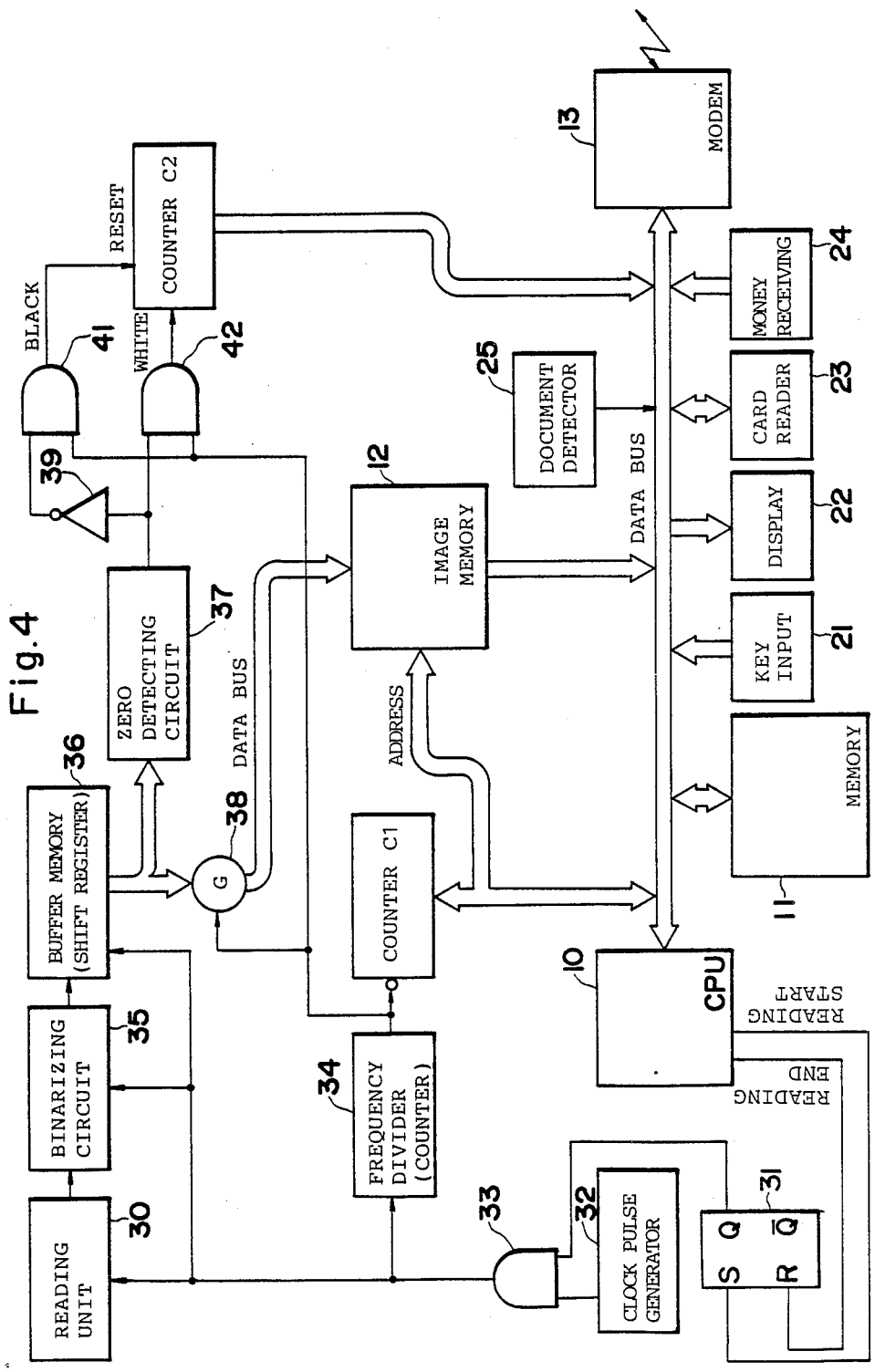

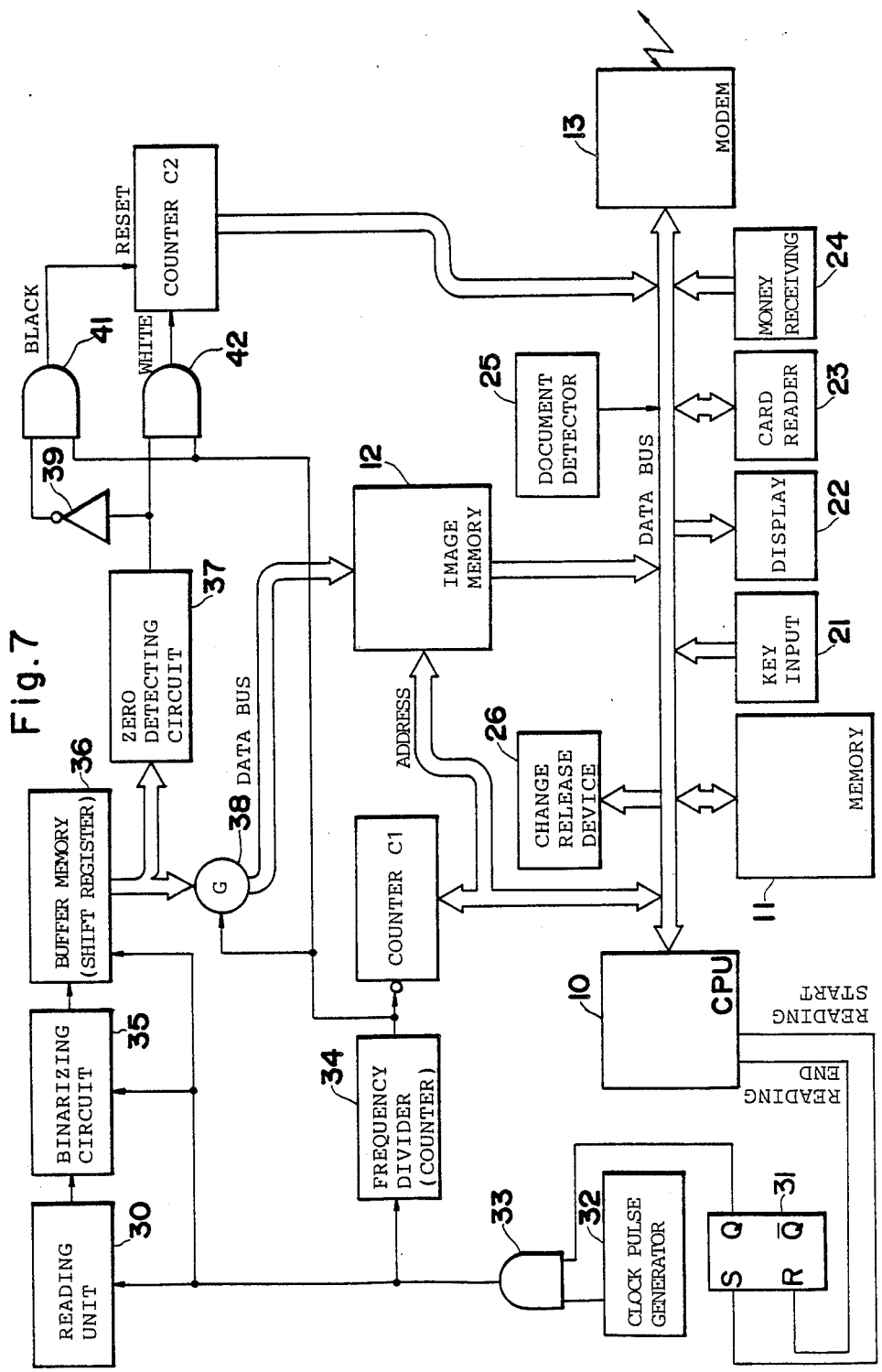

METHOD OF FACSIMILE TRANSMISSION AFTER COLLECTION OF FACSIMILE CHARGE AND APPARATUS THEREFOR

This application is a continuation of application Ser. No. 884,559, filed July 11, 1986, now abandoned.

BACKGROUND OF THE INVENTION

The present invention relates to a method of facsimile transmission and apparatus therefore and, more particularly, to a facsimile apparatus of the type which collects the facsimile charge (including a rental fee of the facsimile apparatus, rental fee of the telephone line or communication line and the like) each time the facsimile apparatus is used on the assumption of many and unspecified users, and also to a transmitting method in such an apparatus.

The facsimile apparatuses of the type which collects monthly charges for the uses of the specified persons or companies have conventionally fairly spread. However, the facsimile apparatus of the foregoing type such that the charge is automatically received each time the facsimile is used is not developed yet. In the public telephones and other telephones which can be used by unspecified persons and each of which the charge is collected each time the telephone is used, the system such that a fixed amount of charge is automatically collected for every charging pulse to be sent from the station of telephone company is adopted. The application of such an automatic charge collecting system to the facsimile apparatus cannot be always said to be proper due to the following reasons. (1) In the case of the telephone in which the charge is paid by the coins or cards, the telephone line will be automatically disconnected when the fee of a telephone call reaches the total amount of coins put into the telephone. However, in the case of the facsimile apparatus, if the line is disconnected while a document (a sheet of paper on which information to be transmitted is expressed by character data, image data and the like) is being scanned, this will result in an unfavorable situation on both sides of the facsimile apparatus and the user. (2) In many cases, the user wants to preliminarily know the facsimile fee.

SUMMARY OF THE INVENTION

It is an object of the present invention to provide a facsimile apparatus and a facsimile transmitting method in which the information of a document can be transmitted without being interrupted during the transmitting operation and also the facsimile charge can be collected.

A transmitting method in a facsimile apparatus according to the present invention comprises the steps of: calculating a facsimile charge on the basis of the data regarding an amount of information to be transmitted; receiving the value corresponding to the facsimile charge calculated; and thereafter transmitting the facsimile information.

The amount of information to be transmitted may be automatically measured or may be input by the user by himself. For example, a length of data read from the document may be counted to set the counted length as an amount of information to be transmitted. On the other hand, the data indicative of the size of paper of the document set and the number of papers may be also used as data with respect to an amount of information to be transmitted. The paper size and the quantity of papers may be either automatically read by use of various kinds of sensors or key input from a key input apparatus.

For the reception of the value commensurate with the facsimile charge, as well as the reception of the cash (coins, paper money and the like), it is also possible to rewrite (or update) the data representative of the balance of the value recorded in a card. A magnetic card such as what is called a telephone card or the like in which the value has been recorded is used. Such a card is simply referred to as a card hereinafter. The value of this card (referred to as a balance in the embodiments) is read by a card reader. The value corresponding to the facsimile charge is subtracted from the value read. The subtracted result is recorded into the card, so that the facsimile charge can be collected. The technology itself for collecting the charge by the cash, e.g., money receiving apparatus is well known. The value commensurate with the facsimile charge may be also received by other ways.

In this invention, the facsimile charge is first calculated prior to the facsimile transmission. After the reception of the facsimile charge has been confirmed, a desired information is transmitted. Therefore, all of the information on the document which the user wants to transmit can be facsimile transmitted without being interrupted during the transmitting operation. In addition, since the calculated facsimile charge is displayed, the user can preliminarily know the fee.

BRIEF DESCRIPTION OF THE DRAWINGS

FIGS. 1 to 3b show the first embodiment of the invention, in which FIG. 1 is a block diagram showing an electrical arrangement of a facsimile apparatus, FIG. 2 is a memory map showing contents of a part of a memory, and FIGS. 3a and 3b are flowcharts showing processing procedures in the facsimile apparatus.

FIGS. 4 to 6b show the second embodiment, in which FIG. 4 is a block diagram, FIG. 5 is a memory map, and FIGS. 6a and 6b are flowcharts.

FIGS. 7 to 9 show the third embodiment, in which FIG. 7 is a block diagram, FIG. 8 is a memory map, and FIG. 9 is a flowchart.

FIGS. 10 to 13b show the fourth embodiment, in which FIG. 10 is a block diagram, FIG. 11 is a constitutional diagram of a size detector of a document, FIG. 12 is a memory map, and FIGS. 13a and 13b are flowcharts.

FIGS. 14 to 15c show the fifth embodiment, in which FIG. 14 is a memory map, and FIGS. 15a to 15c are flowcharts.

DESCRIPTION OF THE PREFERRED EMBODIMENTS First Embodiment

This embodiment shows a facsimile apparatus suitable to transmit the information of one sheet of document. The facsimile charge is fundamentally paid by use of a card. The facsimile number on the transmitted side has been recorded in the card as well.

Figure 1:
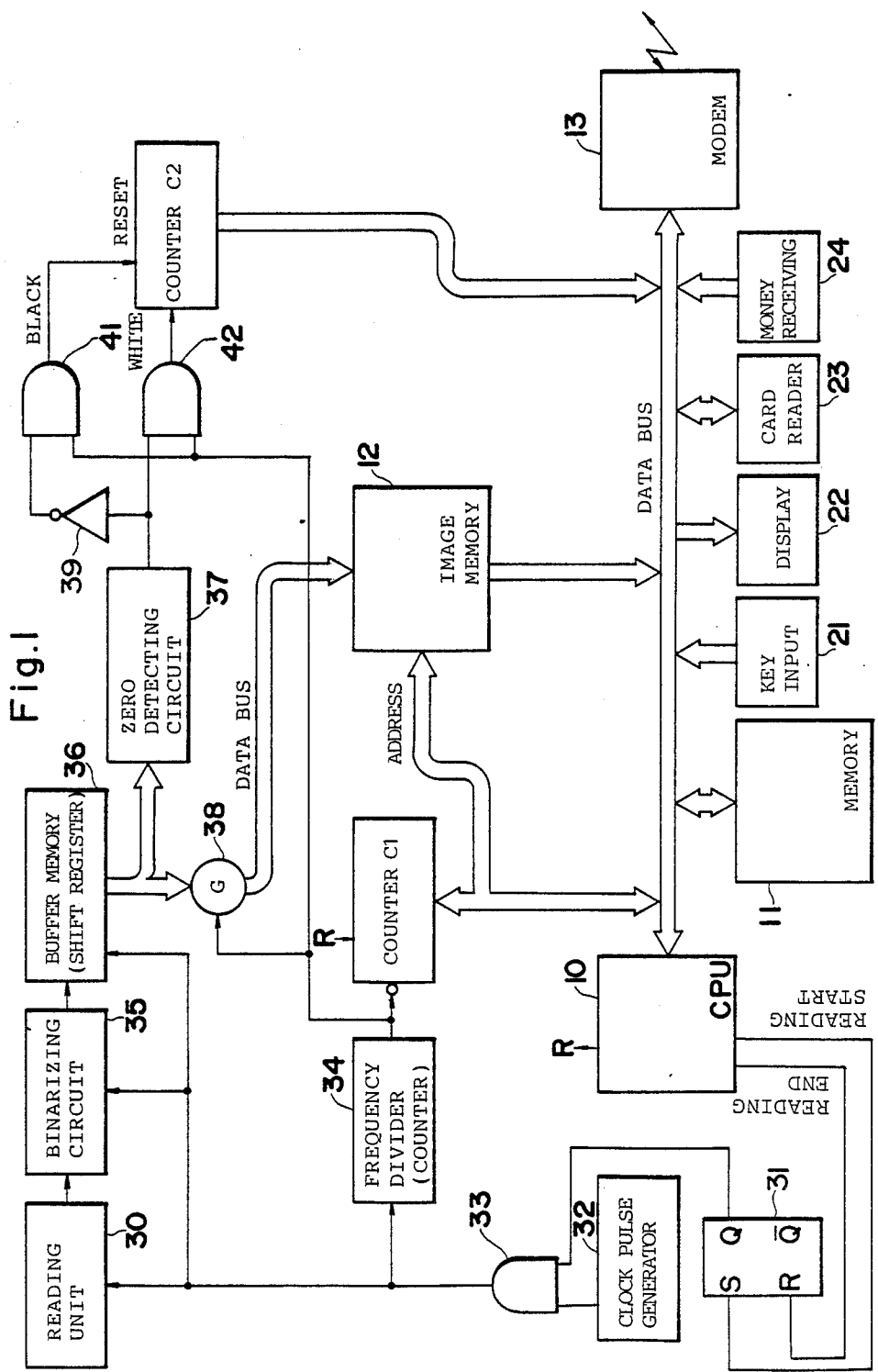

FIG. 1 shows an outline of an electrical arrangement of the facsimile apparatus.

The facsimile apparatus is controlled by a CPU 10. A memory 11 for storing programs which are executed by the CPU 10 and the necessary data and an image memory 12 for storing the information of a document to be transmitted are connected to the CPU 10 through various kinds of buses (only parts of buses are shown in the diagram).

This facsimile apparatus is provided with: a key input apparatus 21 including keys by which the user inputs the facsimile number (telephone number, FAX No.) on the transmitted side (it is unnecessary to input the FAX No. in this embodiment) and the necessary commands, e.g., a reading start key, which will be explained hereinafter; a display device 22 to display a guidance and instructions for the user; a card reader 23 to read the data recorded on the card; and a money receiving apparatus 24 for receiving coins (also including paper money as necessary) and discriminating the validity and kind of this money. These apparatuses 21 to 24 are connected as input apparatuses to the CPU 10 through various kinds of buses and necessary interfaces (not shown).

The facsimile data is transmitted and received through a modem 13. The modem 13 is also connected to the CPU 10, memories 11 and 12, and other apparatuses through various kinds of buses.

The data written or recorded on the document is read by a reading apparatus 30. The reading apparatus 30 may be, for example, a sensor array including a number of reading elements arranged in a line in the main scanning direction. The reading timing is controlled by a clock pulse which is output from a clock pulse generator 32. The clock pulse is transmitted through a gate 33 to the reading apparatus 30, a binarizing circuit 35, a buffer memory (shift register) 36, and a frequency divider (counter) 34, which will be explained hereinafter. The gate 33 is controlled by a flip-flop 31. The flip-flop 31 is set and reset by a reading start signal and a reading end signal which are output from the CPU 10, respectively.

The frequency divider 34 is supplied with a clock pulse through the gate 33 and frequency divides the clock pulse by the number of bits (e.g., eight bits) of one byte of the image memory 12. An output pulse of the frequency divider 34 is sent to a counter $C_1$ and gates 38, 41 and 42, respectively. The counter $C_1$ counts the trailing edge of the output pulse of the frequency divider 34 and an address in the image memory 12 is designated by the output of the counter $C_1$.

The read signal output from the reading apparatus 30 is sent to the binarizing circuit 35 and converted into a binary signal indicative of the white and black levels. The binary signal is temporarily stored into the buffer memory 36 on a one-byte unit basis. Since the gate 38 is opened at the timing of the leading edge of the output pulse of the divider 34, the read data (binary data) of one byte is stored into the memory location having the address to be designated by the counter $C_1$ in the image memory 12.

The read data of the buffer register 36 is also sent to a zero detecting circuit 37. The zero detecting circuit 37 generates an output signal of a high "H" level when all of one-byte input data are zero (all zero). This output signal is transmitted to the gate 42 and at the same time, it is inverted by a NOT circuit 39 and supplied to the gate 41.

The gates 41 and 42 are controlled by the output pulse of the frequency divider 34. Therefore, when the output of the zero detecting circuit 37 is at an "H" level, one pulse is input to a counter $C_2$ through the gate 42 at the timing of this control pulse and counted by the counter $C_2$. When the output of the zero detecting circuit 37 is at a low "L" level, on the contrary, one pulse is output from the gate 41 at the timing of the control pulse and transferred to the counter $C_2$ as a reset signal thereof. At this time, the counter $C_2$ is reset and its count value is returned to 0. Therefore, the count value of the counter $C_2$ represents the number of continuous bytes at the white level of the read binary signal.

The counter $C_2$ is provided to detect the absence of the transmitting information written on the document due to the feeding operation of the document or due to the reading operation in the sub-scanning direction of the document. In other words, the counter $C_2$ detects the blank portion on the document. The count value of the counter $C_2$ is read by the CPU 10.

Figure 2:
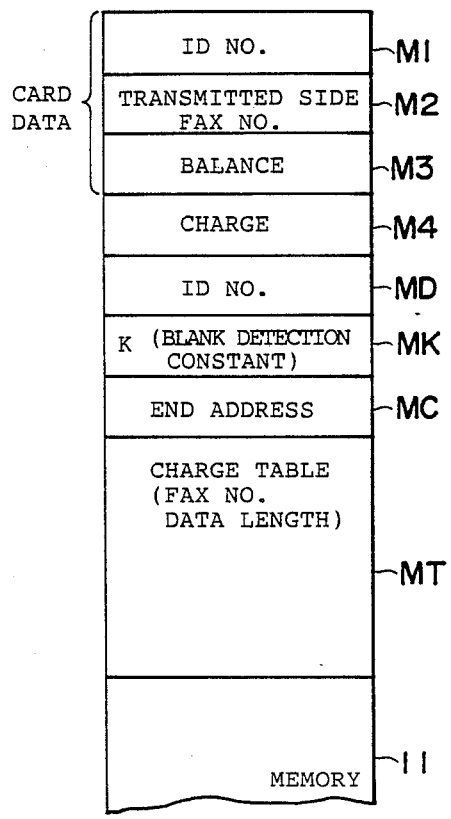

FIG. 2 shows a part of the memory 11. The memory 11 includes therein: an area $M_1$, $M_2$, $M_3$ to store the card data; an area $M_4$ to store the facsimile charge calculated; an area MD to store the identification number (ID No.) serving as a reference number to check the ID No. of the card; an area MK to store a constant for detection of the blank portion; an area MC to store the end address of the memory location in the image memory 12 where the data has been stored; and an area MT which is used as a charge table.

The data such as code indicating that the card is fitted for the facsimile or telephone, i.e., the ID No., telephone number on the transmitted side of the facsimile, i.e., the FAX No., and amount (value) which can be used to pay the charge, i.e., the balance, and the like are recorded in the card. These data read from the card are stored into areas $M_1$, $M_2$, and $M_3$.

A constant K for detection of the blank portion is compared with the count value of the counter $C_2$. Assuming that the number of bits of one byte of the image memory is $B_i$, the number of bits in the main scanning direction is N, and the length, i.e., the number of bits in the sub-scanning direction to recognize the blank portion is M, the constant K can be expressed by $(N/B_i) \cdot M$.

Various kinds of systems are considered to calculate the facsimile charge. For example, in the case of using the system in which the charge is calculated in accordance with the transmission distance and transmission time, a charge table such that the charge is determined in accordance with the FAX No. (only the station number or area code) and data length (count value of the counter $C_1$), which will be explained hereinafter, is provided in the charge table area MT.

Figure 3A:
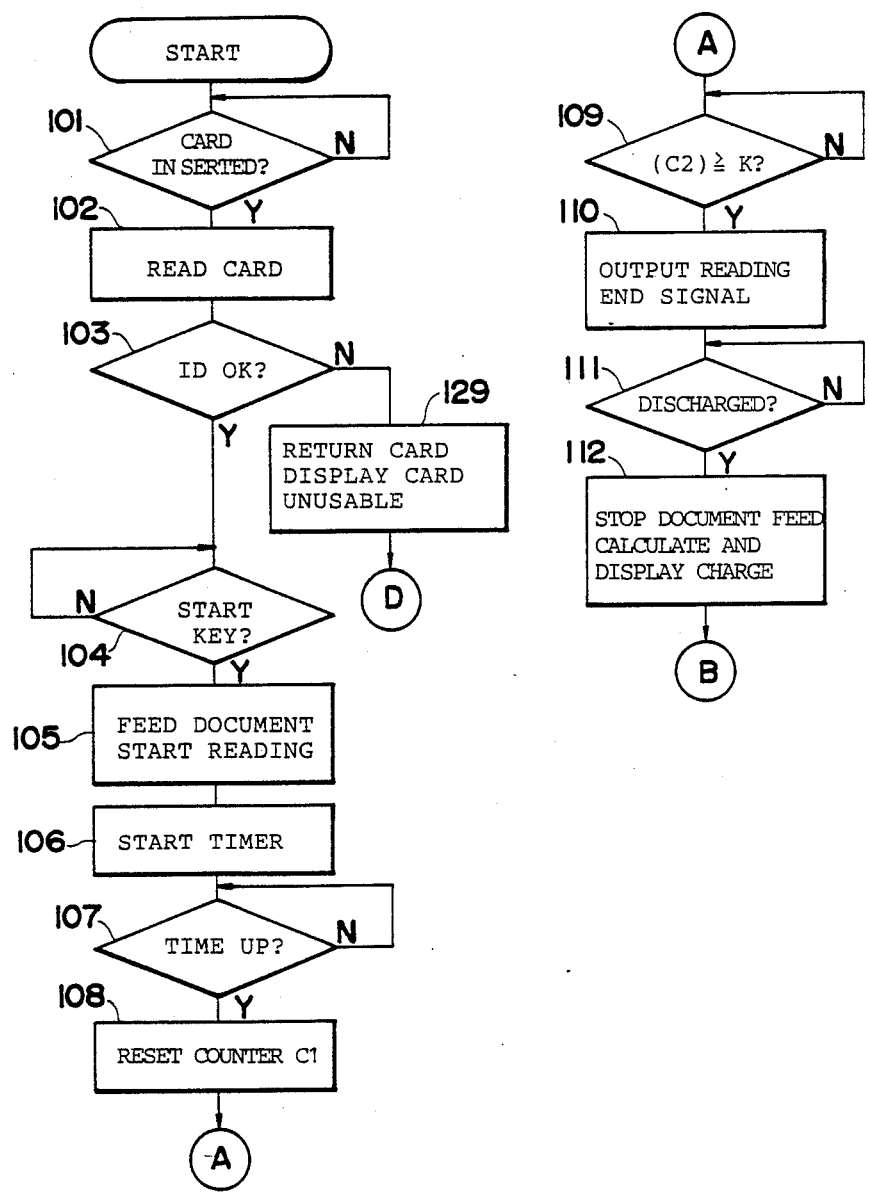
Figure 3B:
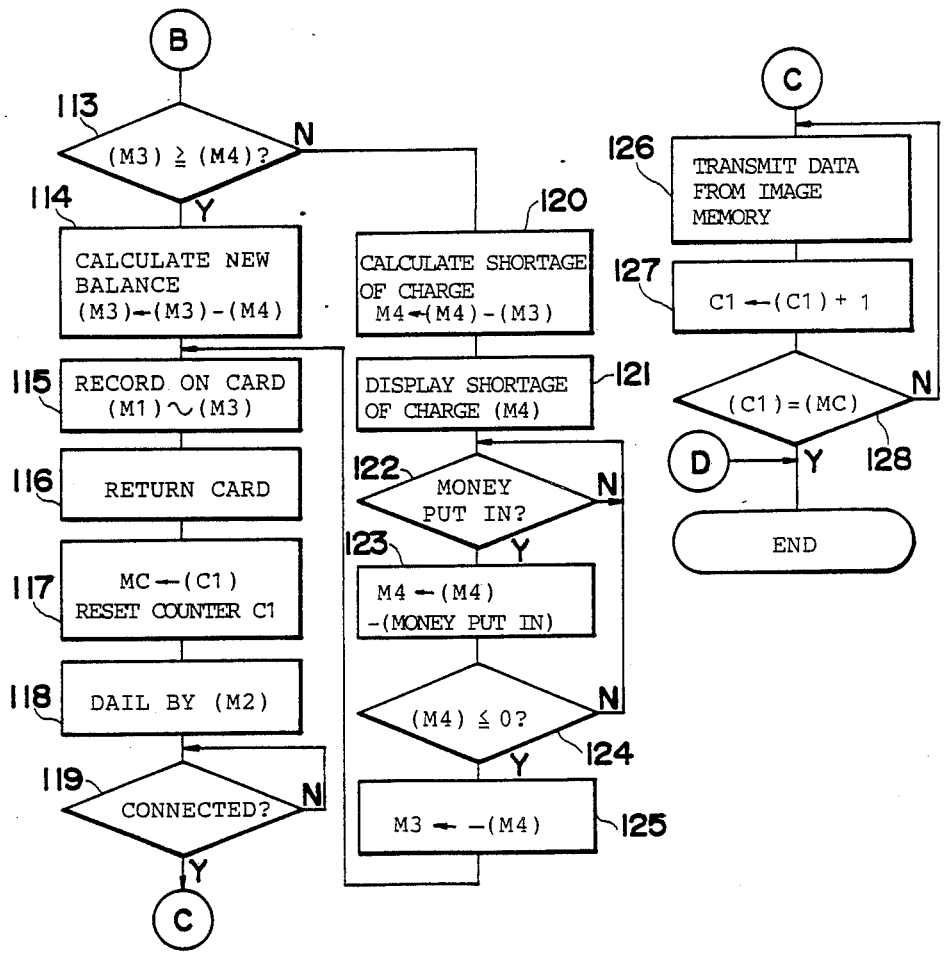

FIGS. 3a and 3b show a facsimile transmission processing procedure executed by the facsimile apparatus, particularly, the CPU 10.

First, the user sets the document at a predetermined location and inserts the card into the card reader 23. A check is made to see if the card has been inserted or not (step 101). The data recorded in the card is read by the card reader 23 and stored into the areas $M_1$ to $M_3$ in the memory 11 (step 102).

The ID No. in the card data stored in the area $M_1$ is collated with the reference ID No. in the area MD to see if the inserted card is the authorized card or not (step 103). If YES in step 103, the next processes for the facsimile transmission will be executed. In the case of the invalid card, the message indicating that this card cannot be used is displayed on the display device 22 and the card is returned and the processes are finished (step 129).

When it is determined that the document reading start key in the key input apparatus 21 has been pressed (step 104), a reading start signal is output from the CPU 10. Thus, the flip-flop 31 is set and the gate 33 is opened. The feeding operation of the document is started (step 105). The time until the front edge of the document reaches the reading position of the reading apparatus 30 is measured by a timer (not shown) (steps 106 and 107). In place of the measuring by the timer, a sensor is provided at the reading position and the arrival of the front edge of the document at the reading position may be also detected by this sensor. Thereafter, a reset signal R is output from the CPU 10 and the counter $C_1$ is reset (step 108).

In the circuit of FIG. 1, the data on the document is sequentially read by the reading apparatus 30 as the document is fed. Each time the data of one byte has been read, the count value of the counter $C_1$ is increased by "1". The read data is sequentially stored into the memory location in the image memory 12 which is addressed by the output of the counter $C_1$.

The count value of the counter $C_2$ also increases in accordance with the length of continuous blank portion existing on the document.

When the count value of the counter $C_2$ has reached the constant K, the reading operation of the document is completed (step 109). Then, a reading end signal is output from the CPU 10 and the flip-flop 31 is reset (step 110). A check is then made to see if the document has been discharged or not due to the detection of a discharge sensor or the timing measurement by the timer (step 111).

After the document was discharged, the feeding operation of the document is finished and the facsimile charge is calculated (step 112). On the basis of the FAX No. stored in the area $M_2$ in the memory 11 and the data length indicated by the count value of the counter $C_1$, the facsimile charge corresponding to them is taken out of the charge table in the area MT and transferred to the area $M_4$ and also displayed on the display device 22.

The balance (stored in the area $M_3$) of the card is compared with the calculated charge (stored in the area $M_4$) and when the balance is larger than the calculated charge, the facsimile charge can be paid by the card (step 113). In this case, the facsimile charge is subtracted from the balance and the subtracted result is stored as a new balance into the area $M_3$ (step 114). The data in the areas $M_1$ to $M_3$ is respectively recorded into the card by the card reader 23, so that the balance in the card data is updated (step 115). Thereafter, the card is returned (step 116).

The count value of the counter $C_1$ indicates the end address of the read data stored in the image memory 12. This count value is transferred to the area MC and thereafter the counter $C_1$ is reset (step 117).

After the telephone number was automatically dialed using the FAX No. in the area $M_2$ (step 118), a check is made to see if the line has been connected or not (step 119). If YES in step 119, the read data is read out of the image memory 12 on a one-byte unit basis and sent to the transmitted side through the modem 13 (step 126). Each time one byte of the read data has been read, the count value of the counter $C_1$ is increased by "1" (step 127). This is because the address in the image memory 12 is designated by the count value of the counter $C_1$. When the count value of the counter $C_1$ has reached the end address in the area MC, the transmission of all of the read data is finished (step 128). Thus, the facsimile transmission of the data on a sheet of document is completed.

In this embodiment, if the balance (in the area $M_3$) of the card is smaller than the charge (in the area $M_4$), a shortage of charge can be paid in cash. In this case, the shortage of charge is calculated (step 120) and displayed on the display device 22 (step 121). The calculated shortage is stored into the area $M_4$.

When the money has been put into the money receiving apparatus 24 (step 122), the validity and kind of this money are checked and the total amount of money put into the apparatus 24 is calculated. If this total amount is larger than the shortage (steps 123 and 124), the data indicative of the surplus (change) is transferred to the area $M_3$ (step 125). Thereafter, the processes for the recording of the data into the card, automatic dial, facsimile transmission will be executed.

In this embodiment, if there is the change when the shortage of charge was paid in cash, it is recorded as a balance into the card. However, a change release device is provided and the change may be also released as cash.

As in the second embodiment which will be explained hereinafter, the FAX No. may be key input. The card reading processes (steps 101 to 103) and document reading processes (steps 104 to 111) may be also reversely arranged.

Second Embodiment

This embodiment shows a facsimile apparatus fitted to transmit the information of a plurality of sheets of documents. The facsimile charge is paid by either the card or cash. The FAX No. on the transmitted side is key input.

FIG. 4 shows an electrical arrangement of the facsimile apparatus of this embodiment. This apparatus is substantially the same as the apparatus shown in FIG. 1 excluding that a document detector 25 is further provided; therefore, the same parts and elements as those shown in FIG. 1 are designated by the same reference numerals and their descriptions are omitted. The document detector 25 detects the presence or absence of a document at the position where the document should be set or located.

Figure 5:
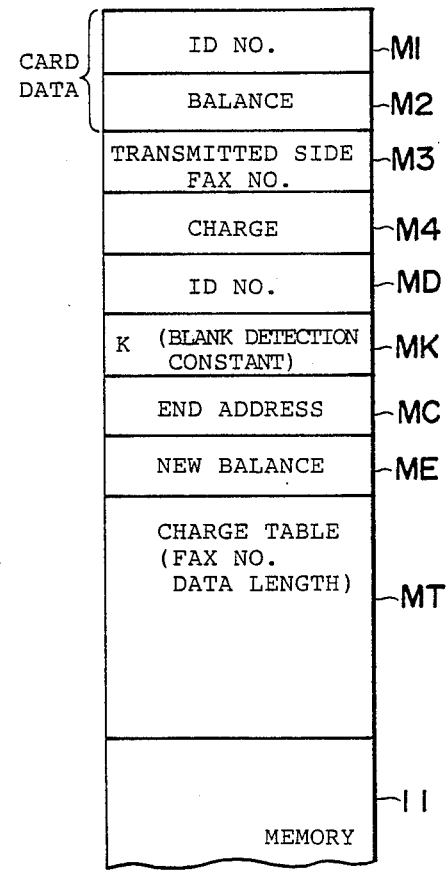

FIG. 5 shows a part of the content of the memory 11. Since this embodiment intends to key input the FAX No. on the transmitted side, no FAX No. is recorded in the card. The areas $M_1$ and $M_2$ are provided to store the card data. The key input FAX No. is stored into the area $M_3$. An area ME to store the new balance is further provided. The other data arrangement is the same as that shown in FIG. 2.

Figure 6A:
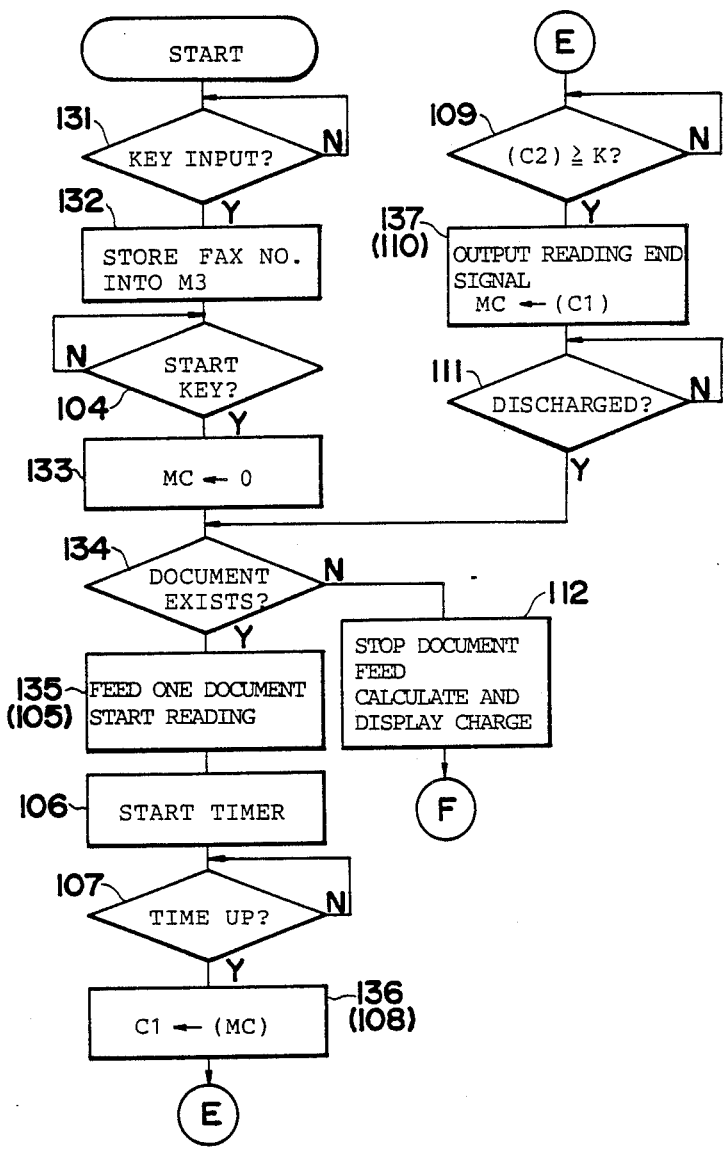
Figure 6B:
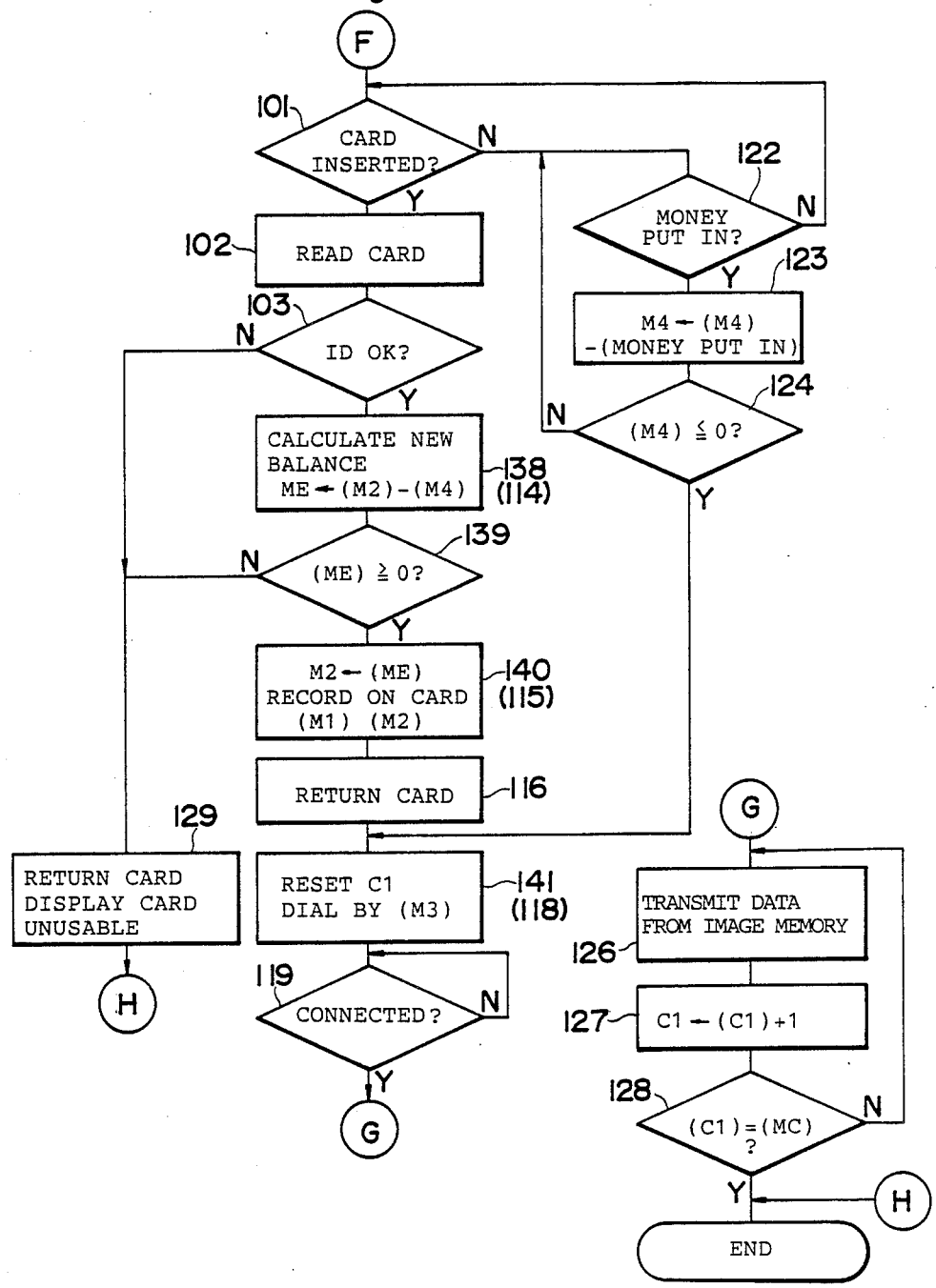

FIGS. 6a and 6b show a processing procedure of the facsimile apparatus. The same processes as those shown in FIGS. 3a and 3b are designated by the same reference numerals irrespective of the order of the processes. The processes which are concerned with those shown in FIGS. 3a and 3b are also designated in parentheses by the same reference numerals as those of the corresponding processes in FIGS. 3a and 3b.

When the FAX No. is key input from the key input apparatus 21 (step 131), it is stored into the area $M_3$ in the memory 11 (step 132).

When the reading start key is input (step 104), the area MC is cleared (step 133).

If a document detection signal is generated from the document detector 25, this means that one or a plurality of sheets of documents have already been set (step 134). Therefore, the feeding operation of one document located at the top or bottom is started and a reading start signal is output from the CPU 10 (step 135 (105)).

When it is determined that this document has been sent to the reading position (steps 106 and 107), the content of the area MC is preset to the counter $C_1$ (step 136 (108)). Since the area MC has been cleared in the case of the first document (step 133), counter $C_1$ is preset to zero (the same effect as the reset).

Thereafter, the document fed is read and the read data is stored into the image memory 12. It will be appreciated that the address location where the read data will be stored is designated by the count value of the counter $C_1$.

When the count value of the counter $C_2$ has reached the constant K, the end of reading operation of one document is decided (step 109). Then, a reading end signal is output from the CPU 10 and at the same time, the count value of the counter $C_1$ is transferred into the area MC (step 137). After the document which had been completely read was discharged (step 111), a check is made to see if any other document still exists at the set position or not (step 134). If YES, the next document is similarly fed and the information on the document is read and these processes are repeated (steps 135(105), 106, 107, 136(108), 109, 137(110)). In step 136, since the end address data in the area MC has been preset to the counter $C_1$, the read data of the second and subsequent documents is sequentially stored into the image memory 12 from the address next to the end address location where the preceding read data was stored.

The information of a plurality of documents is sequentially read one document by one and the read data is stored into the image memory 12. If no document exists at the set position of the document (NO in step 134), the document feed is stopped and the facsimile charge is calculated on the basis of the table in the area MT and displayed on the display unit 22 in a manner similar to the first embodiment (step 112). The calculated charge is stored into the area $M_4$. In the case of a plurality of documents, it will be obviously understood that the data lengths of all documents (i.e., the final count value of the counter $C_1$ or the content of the area MC) become the basic factors for calculation of the charge.

In this embodiment, the user can pay the facsimile charge by either the card or cash.

In the case where the user wants to pay the charge by the card, the card is inserted; therefore, the card data is read and the ID No. is checked (steps 101, 102, 103). The charge (in the area $M_4$) is subtracted from the balance (in the area $M_2$) of the card and a new balance is obtained (step 138 (114)). This new balance is then stored into the area ME. If the new balance is a positive value or 0, the charge can be paid by the card (step 139). Therefore, the new balance in the area ME is transferred to the area $M_2$ and the data in the areas $M_1$ and $M_2$ is recorded into the card and the card is then returned (steps 140 (115), 116).

In the case where the new balance (in the area ME) has a negative value, the charge cannot be paid by the card, so that in this embodiment, the card will be returned and the message "This card cannot be used." will be displayed on the display until 22 and the processes will be finished (step 129).

In this case, the shortage of charge may be paid in cash as in the first embodiment.

Thereafter, the counter $C_1$ is reset and the telephone number is automatically dialed using the FAX No. in the area $M_3$, and if the line is connected, the read data stored in the image memory 12 will be sequentially transmitted through the modem 13 (steps 141 (118), 119, 126, 127, 128).

In the case where the card is not inserted, a check is made to see if coins or paper money have been put into the apparatus 24 or not (step 122). If YES in step 122, the validity and kind of money put in are discriminated and a total amount of money is calculated. If the total amount of money put in exceeds the charge (in area $M_4$)(steps 123, 124), the automatic dialing and data transmitting processes will be executed.

The difference between the charge and the total amount of money put in may be also released as a change.

Although the FAX No. is key input in the second embodiment, it may be also recorded in the card as in the first embodiment. In addition, the document reading processes and the key input processes of the FAX No. may be reversely executed.

Third Embodiment

The third embodiment is a modified form of the second embodiment. The information of a plurality of sheets of documents can be facsimile transmitted. The charge is paid by the card in principle. In the case where the balance of the first card lacks, the shortage of charge can be paid by use of the second card or further many other cards as necessary. In place of the payment by the second card, the shortage can be also paid in cash. At this time, if there is a change, it may be also released.

Referring now to FIG. 7 showing the apparatus of the third embodiment, a change release device 26 is further added to the apparatus of FIG. 4. The change release device 26 is also controlled by the CPU 10.

Figure 8:
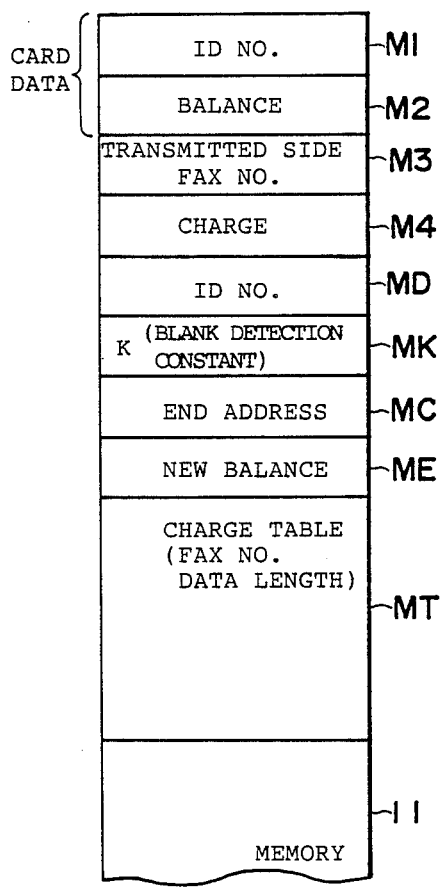

A part of the memory 11 shown in FIG. 8 is substantially the same as FIG. 5.

Figure 9:
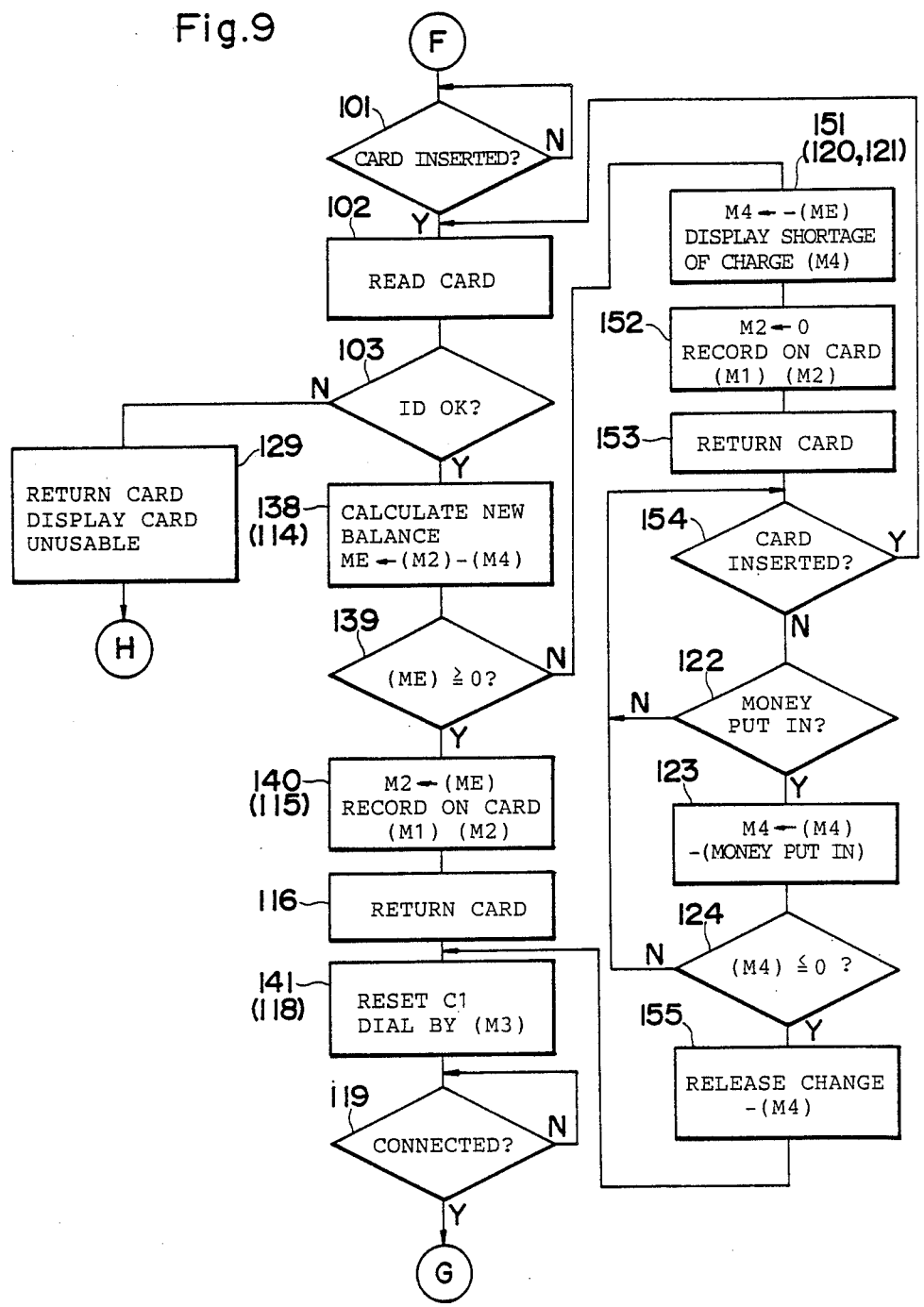

FIG. 9 shows only the portions peculiar to the third embodiment in the flowcharts shown in FIGS. 6a and 6b. Namely, the flow for payment of the facsimile charge (almost corresponding to FIG. 6b) is extracted and shown in FIG. 9. In FIG. 9 as well, the same processes as those shown in FIGS. 3a and 3b or in FIGS. 6a and 6b are designated by the same reference numerals.

In FIG. 9, the paying processes of the charge by the cards (steps 101, 102, 103, 138 (114), 139, 140 (115), 116, 129) are substantially the same as those shown in FIG. 6b.

If the result (in area ME) of the subtraction of the charge (in area $M_4$) from the balance (in the area $M_2$) of the first card is a negative value (step 139), the absolute value of the result of this subtraction is transferred to the area $M_4$ and at the same time, the shortage of charge (result of the subtraction) is displayed on the display device 22 (step 151 (120, 121)). As a new balance, 0 is stored into the area $M_2$ and the data in the areas $M_1$ and $M_2$ is recorded into the first card and thereafter the card is returned (steps 152, 153). Since the balance of the first card returned is 0, this card cannot be used any more.

The user can also use the second card to pay the shortage of charge or may put cash into the apparatus 24.

When the user inserts the second card (step 154), the same processes as those in the case of the first card are executed by returning to step 102. If the balance of the second card is equal to or exceeds the shortage of charge (YES in step 139), the result of the subtraction of the shortage of charge from the balance is recorded as a new balance into the second card and this card is then returned (steps 138, 139, 140(115), 116). In this case, the facsimile transmission can be performed (steps 141(118), 119 and the like).

When the balance of the second card is less than the shortage of charge (NO in step 139), a new shortage of charge is further calculated and at the same time, 0 is recorded as a balance into the second card and the second card is returned (steps 151(120,121) to 153).

In this case as well, the user can pay the new shortage of charge by either the third card or cash.

When the cash was put into the facsimile apparatus, if a total amount of cash is equal to or exceeds the shortage of charge, the facsimile transmission can be executed (steps 122 to 124, 141, 119, etc.). As the result of the subtraction of the shortage of charge from the total amount of cash put in, if there is the surplus, it will be released as a change from the change release device 26 (step 155).

If the cash put in is less than the shortage of charge, the user can pay the new shortage of charge by use of the second or third and subsequent cards (NO in step 124, and in this case, the processing routine is returned to step 154).

In this embodiment as well, the FAX No. may be also recorded in the card. In the case of transmitting the information of one document, on the other hand, the processes may be also executed in a manner similar to the first embodiment.

Fourth Embodiment

FIGS. 10 to 13b show the fourth embodiment. In this embodiment, the facsimile charge is calculated on the basis of the size of the document and the number of documents in place of the length of data to be transmitted. Similarly to the second embodiment, the information of a plurality of sheets of documents can be facsimile transmitted. The FAX No. is key input. The charge may be paid by either the card or cash.

Figure 10:
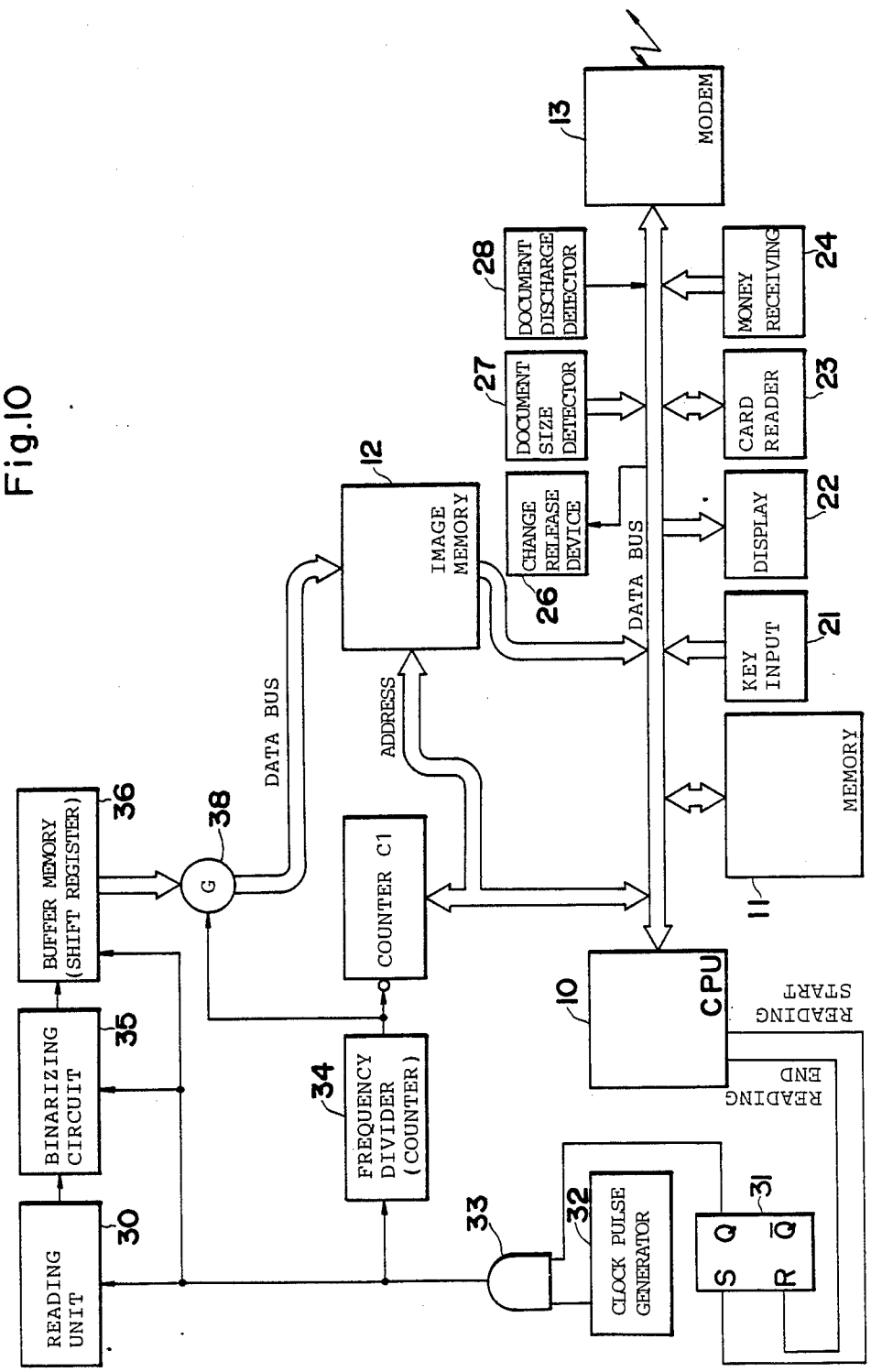

In a block diagram shown in FIG. 10, the zero detecting circuit 37, counter $C_2$, gates 41 and 42, and NOT circuit 39 shown in FIGS. 1, 4, and 7 are omitted. In place of them, in the fourth embodiment, a document discharge detector 28 is provided (although such a kind of detector is also provided (but not shown) in the apparatus in the first to third embodiments). Particularly, in this embodiment, the end of reading of one document is decided by detecting the discharge of this document. The detector 28 may be arranged on the discharge side of the reading position in the reading apparatus 30.

In the fourth embodiment, the change release device 26 and a document size detector 27 are also provided. The other arrangement is substantially the same as that shown in FIG. 1.

Figure 11:
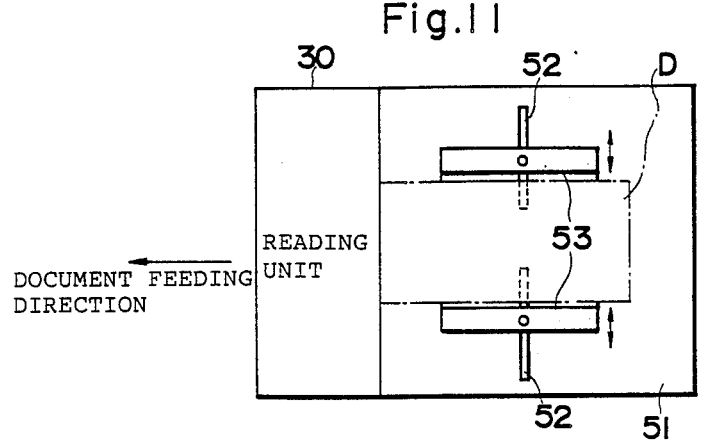

An example of the document size detector 27 is shown in FIG. 11. A mounting plate 51 is provided at the position where a document D will be set. The document D is placed on the mounting plate 51. The plate 51 is formed with two longitudinal holes 52 on both of the right and left sides, the holes extending in the direction perpendicular to the conveying direction of the document D. Guides 53 are also provided on both sides so as to be slidable in the lateral directions along the longitudinal holes 52. The guides 53 can be moved by hand and can interlockingly slide so as to approach or be apart from each other. After the document D is put on the mounting plate 51, the user moves the guides 53 by hand such that the guides 53 are substantially come into contact with both sides of the document D. A number of reflection type photoelectric detectors for projecting the lights upwardly through the longitudinal holes 52 are arranged at regular intervals along the holes 52 below the mounting plate 51. These detectors detect the lights reflected by the document D (and by the guides 53). The size (e.g., A4, B5, or the like) of document D put on the plate 51 is decided in accordance with the number of or positions of detectors which output detection signals.

In this case, it is desirable to preliminarily limit the direction of the document D to be mounted on the plate 51. The size of document may be also determined by detecting not only the length (width of document) in one direction as by the detector 27 in FIG. 11 but also the length in the direction perpendicular to the width of document D.

Figure 12:
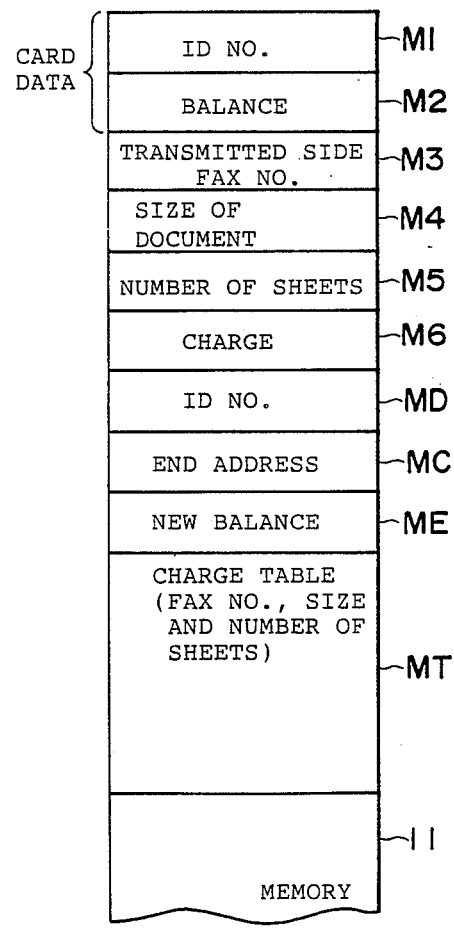

In the memory 11 shown in FIG. 12, the areas $M_1$ to $M_3$ are the same as those shown in FIG. 5. The area $M_4$ is used to store the data with respect to the size of document detected. The area $M_5$ stores the number of documents to be transmitted. The calculated facsimile charge is stored into the area $M_6$. The areas MD, MC, and ME are the same as those shown in FIG. 5. The area M given in FIG. 5 is not provided in FIG. 12. The charge table is constituted such that the facsimile charge is calculated in accordance with the transmission distance (namely, FAX No.), size of document, and number of documents.

Figure 13A:
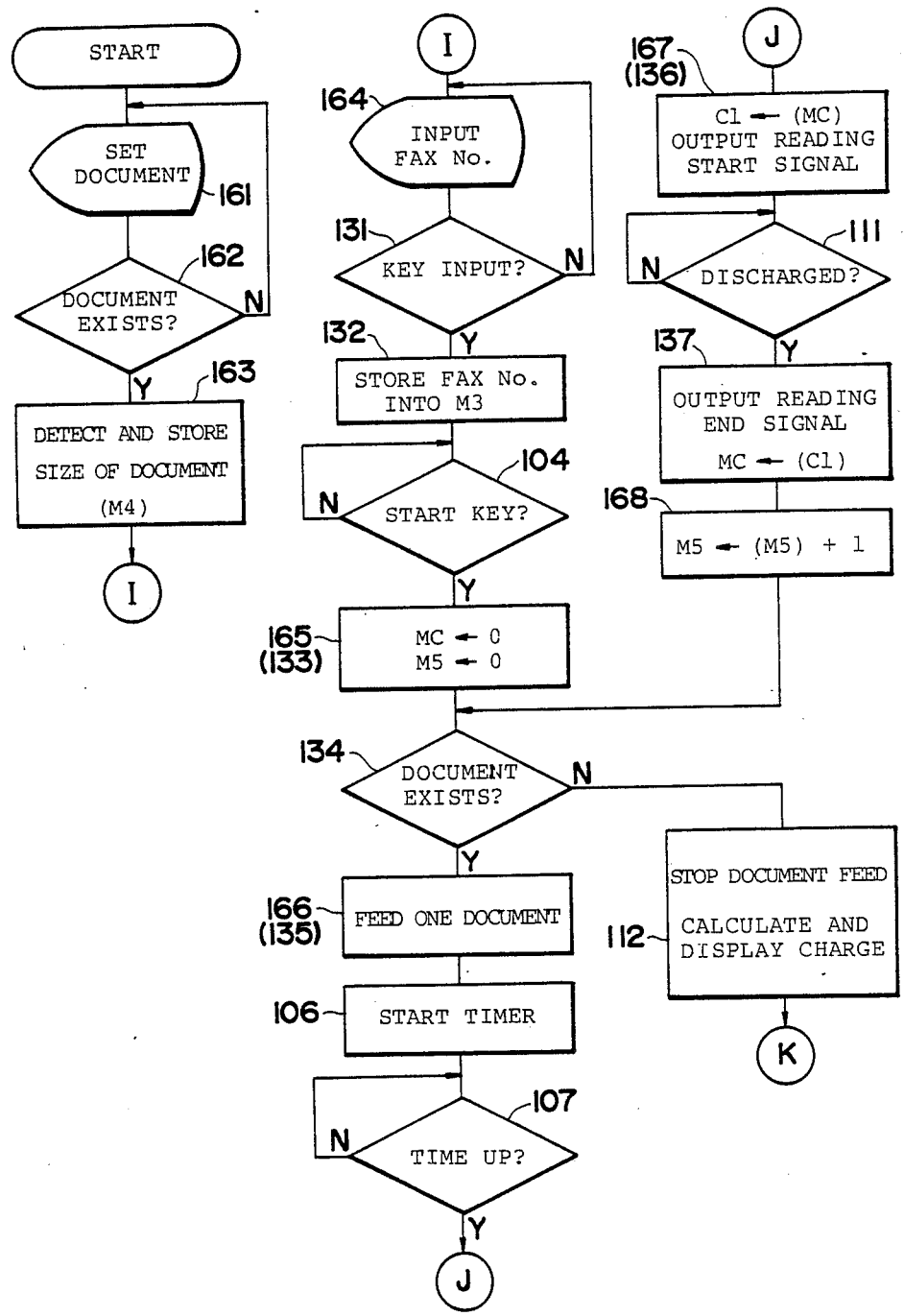
Figure 13B:
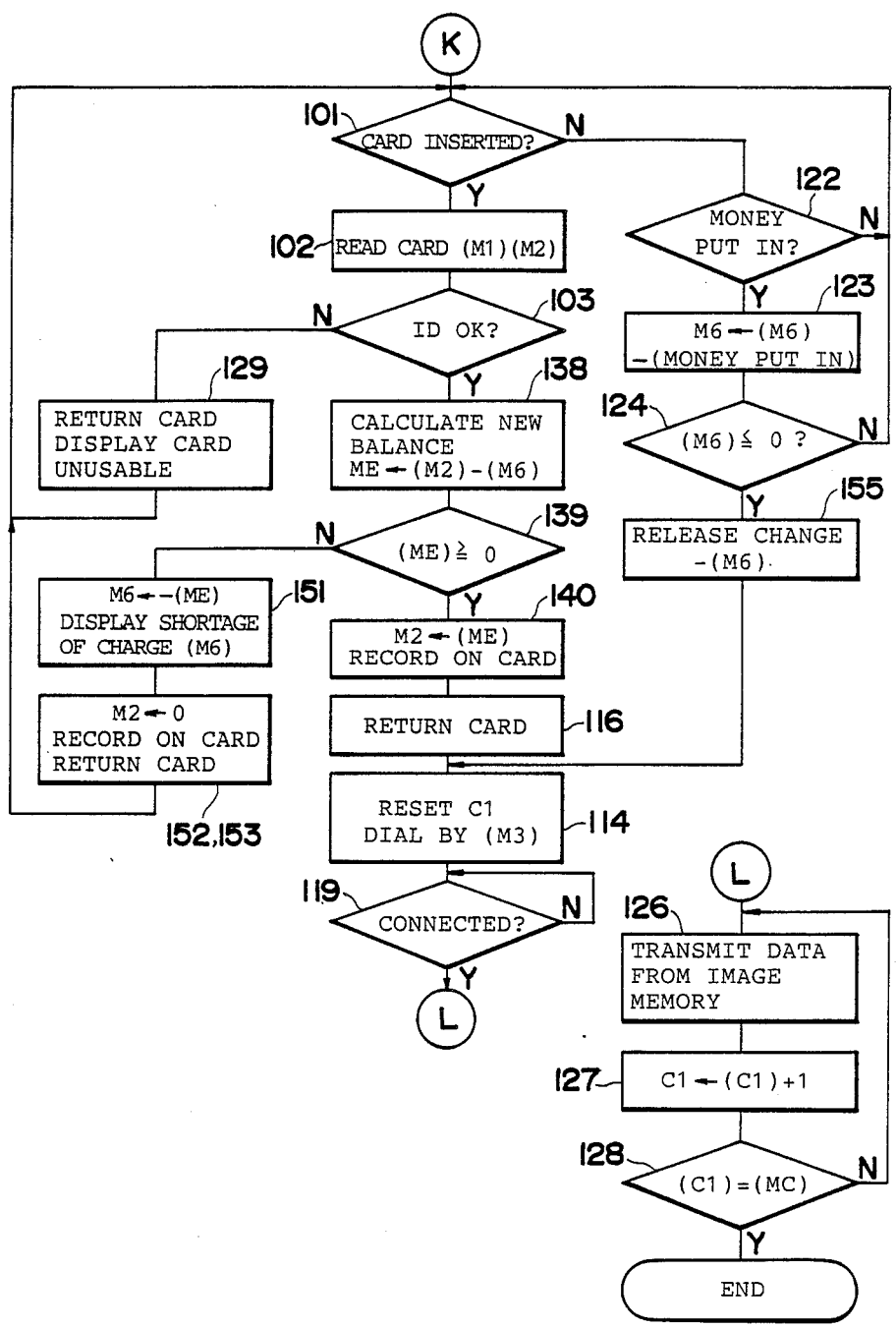

In the flowcharts of FIGS. 13a and 13b, the same processes as those mentioned already with reference to FIGS. 3a, 3b, 6a, 6b, and 9 are designated by the same reference numerals.

First, instructions to set the document and adjust the guides 53 are displayed on the display device 22 (step 161). When the existence of the document D on the plate 51 is decided (step 162), the size of document is detected by the size detector 27 and stored into the area $M_4$ in the memory 11 (step 163).

Subsequently, the instruction to key input the FAX No. is displayed (step 164). After the FAX No. has been key input and the reading start key has been pressed (step 131, 132, 104), the end address area MC and sheet number memory area $M_5$ are cleared (step 165).

The documents on the plate 51 are conveyed to the reading apparatus 30 one by one (steps 134, 166(135,105), 106, 107). When the document has reached the reading position, a reading start signal is output from the CPU 10 and the end address in the area MC is preset to the counter $C_1$ (step 167(136,108)).

When a discharge detection signal is output from the document discharge detector 28, it is determined that the process is at the end of the reading operation for that document (steps 111, 137). The content of the area $M_5$ is increased by "+1" to count the number of documents read (step 168). Dependent upon whether further documents exist (step 134 FIG. 13a), the charge is calculated and displayed or another document is fed.

By repeating the foregoing processes, the information of all documents is read and stored into the image memory 12 and the number of documents is specified. The facsimile charge is read out of the charge table MT on the basis of the FAX No. key input, size of document detected, and number of documents counted and this charge is displayed on the display device 22 (step 112).

Thereafter, the instruction to insert the card is displayed on the display device 22 and the processes such as payment of the charge by use of the card, automatic dial, and transmission of the read data in the image memory 12 are executed in substantially the same manner as those shown in FIG. 9.

In the case of the processes in FIG. 9, if NO in the checking step 103 regarding the ID No., the card will be returned and the processes will be finished. However, in the fourth embodiment, another card can be again inserted (processing routine is returned from step 129 to step 101). It should be noted that the area $M_6$ is used as a charge area.

In this embodiment as well, a single sheet of document can be obviously facsimile transmitted.

Fifth Embodiment

A facsimile apparatus in this embodiment calculates the facsimile charges of respective documents on the basis of the data regarding an amount of information to be transmitted for every document, receives a value above the facsimile charge of at least the first document, and thereafter transmits the information of the document which can be transmitted within a range of the value received.

In this embodiment, the amount of information to be transmitted is calculated on the basis of the paper size of document, and the facsimile charge per one sheet of document is set to the sam fee irrespective of more or less of an amount of information on the document. In addition, in this embodiment, the facsimile charge can be paid by either the card in which the value has been recorded or cash or by both of them. The FAX NO. (telephone number) on the transmitted side is key input.

An electrical arrangement of the facsimile apparatus and a document size detecting apparatus in this embodiment are the same as shown in FIGS. 10 and 11 (in the fourth embodiment), respectively.

Figure 14:
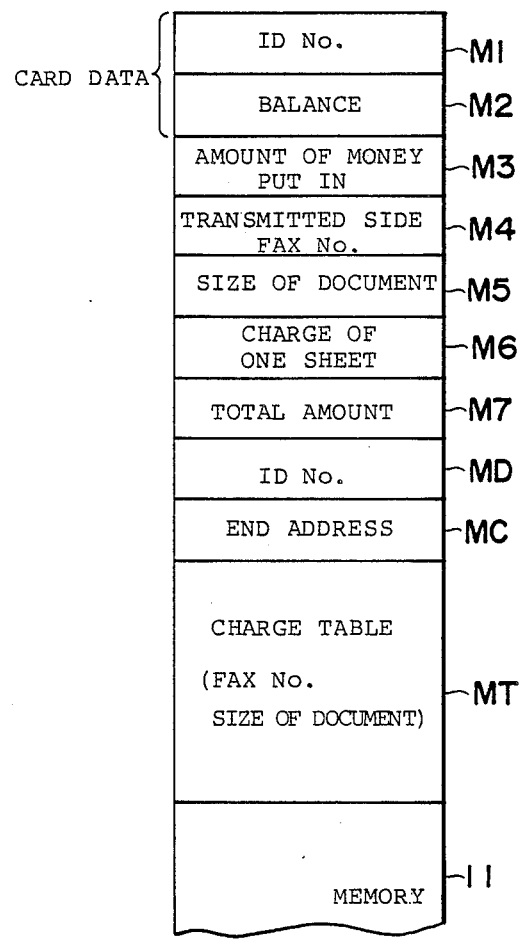

FIG. 14 shows a part of the memory 11. The memory 11 has: areas $M_1$ and $M_2$ to store the card data; an area $M_3$ to store an amount of money received as authorized money among the cash put in; an area $M_4$ to store the FAX No. key input; an area $M_5$ to store the size of document detected; an area $M_6$ to store the calculated facsimile charge per one sheet of document; and an area $M_7$ to store the total amount of money received by use of the card and cash. The memory 11 also has the above-mentioned reference ID No. memory area MD, end address memory area MC of the image memory 12, and area MT which is used as a charge table.

Figure 15A:
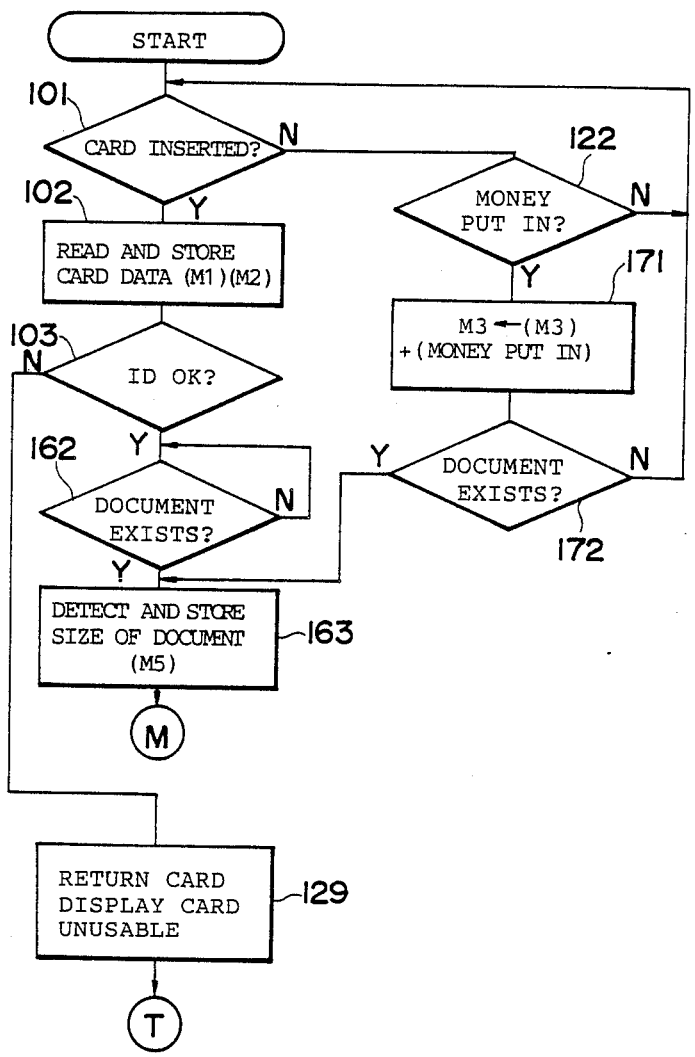
Figure 15B:
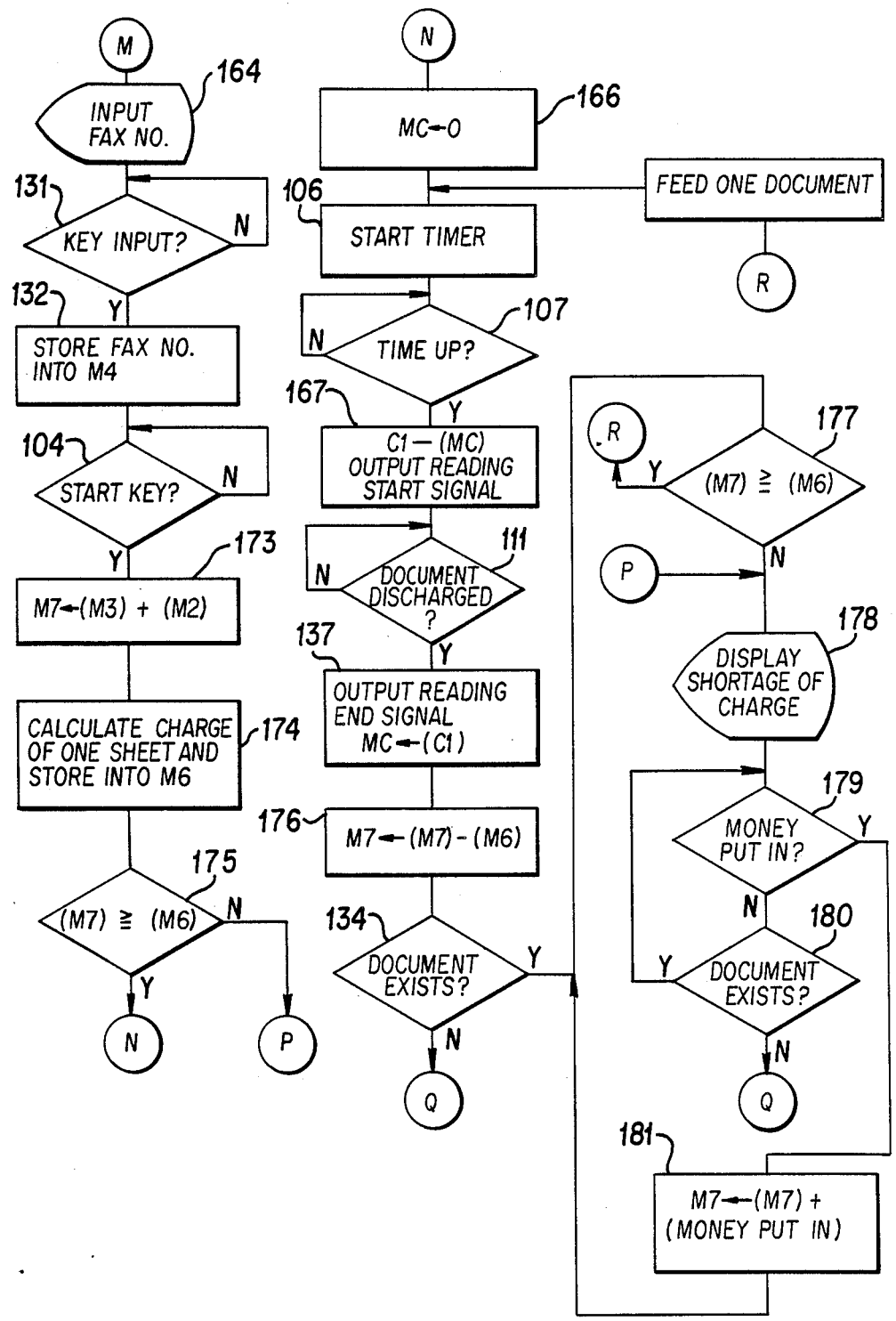
Figure 15C:
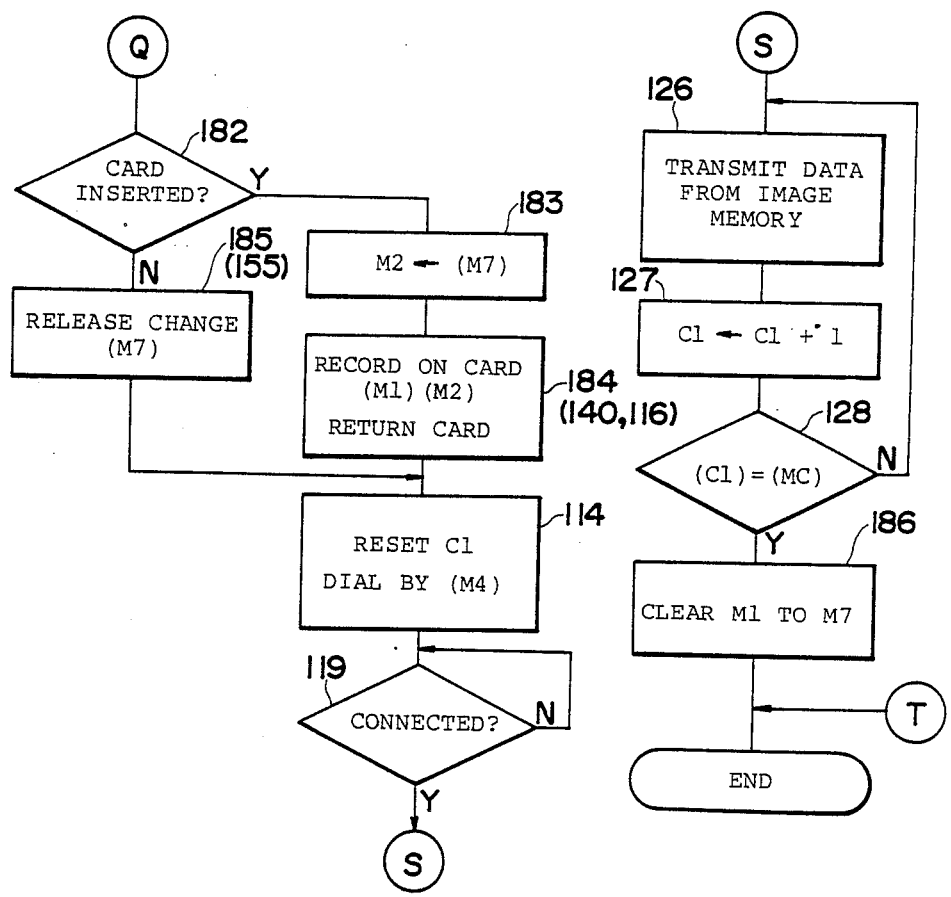

FIGS. 15a to 15c show a processing procedure by the facsimile apparatus, particularly, by the CPU 10. In these diagrams the same processes as those shown in FIGS. 13a and 13b are designated by the same reference numerals.

The user can pay the facsimile charges by use of either the card or cash or by both of them. In the case where the user wants to pay the charge by the card, the inserts the card into the card reader 23. Then, the processes for reading the card data, checking and the like are executed (steps 101 to 103, 129).

In the case where the user wants to pay in cash, he puts coins or paper money into the money receiving apparatus 24 (step 122). The kind and validity of the money are discriminated and an amount of authorized money is added to the content in the area $M_3$ in the memory 11 (step 171). These processes are executed each time money is put in.

When the user presumes that the charge was sufficiently paid by the card and/or cash, he sets the document D to be facsimile transmitted onto the mounting plate 51 in accordance with the message displayed on the display device 22 to instruct the setting of the document and the adjustment of the guides 53. When the existence of the document D on the plate 51 has been decided (steps 162 and 172), the size of document is detected by the size detector 27 and stored into the area $M_5$ in the memory 11 (step 163).

Subsequently, the instruction to key input the FAX No. is displayed (step 164). The key input FAX No. is then stored into the area $M_4$ (steps 131 and 132).

If the reading start key in the key input apparatus 21 has been pressed (step 104), the balance in the card stored in the area $M_2$ is added to the amount of put-in money in the area $M_3$, and the total amount of money which was temporarily paid by the customer is calculated, and this total amount is stored into the area $M_7$ (step 173).

Further, the charge table MT is searched on the basis of the FAX No. key input and the size of document detected, and the facsimile charge per one sheet of document is calculated and stored into the area $M_6$ (step 174).

Next, the total amount of money in the area $M_7$ is compared with the calculated charge per one document in the area $M_6$ (step 175). If the total amount is larger, the information on at least the first document can be transmitted; therefore, the reading processes of the information on the first document will be executed (steps 166, 106, 107, 167, 111, 137).

After completion of the execution of the reading of the information of the first document and the storage of this information into the image memory 12, the facsimile charge (in the area $M_6$) of one sheet of document is subtracted from the total amount in the area $M_7$ and the result of this subtraction is written into the area $M_7$ (step 176).

If any other documents still exist on the plate 51 (YES in step 134), a check is made to see if the total amount updated in the above steps (stored in the area $M_7$) is above the transmission charge of the next one document or not (step 177). If YES in step 177, the information of at least one more documents can be transmitted; therefore, the information of the next one document will be read.

As long as the document exists on the plate 51 and the total amount which is subtracted each time the process to read the information of one sheet of document is executed exceeds the charge of the next one document, the reading process of the document information is sequentially executed.

If no document exists on the plate 51 (NO in step 134), the processes for the card return, change release, facsimile transmission, and the like will be executed in step 182 and subsequent steps.

If the total amount in the area $M_7$ is less than the charge of one document (NO in step 177) irrespective of the existence of the document (YES in step 134), the message indicative of the lack of charge and the shortage of charge are displayed on the display device 22 (step 178).

In this case, the user can select either way such that the shortage of charge is paid in cash or that the transmission of the remaining documents is stopped. When the additional money is put in, the amount of money is added to the total amount in the area $M_7$ (steps 179 and 181). When the total amount in the area $M_7$ is more than the charge in the area $M_6$, the processing routine is returned to the reading process. If no document exists on the plate 51, the process in step 182 will be executed (step 180).

As mentioned in the fourth embodiment, the additional charge may be also paid by using the second card instead of cash.

If any of those cases, after completion of the execution of the reading process of the document, if the card has already been inserted (YES in step 182), the amount in area $M_7$ is transferred into the area $M_2$ (step 183). The data in the areas $M_1$ and $M_2$ is recorded into the card by the card reader 23, so that the balance in the card data is updated and thereafter the card is returned (step 184).

If no card is inserted, the amount of money in the area $M_7$ will be released as a change from the change release device 26 (step 185).

Subsequently, the information of one or a plurality of sheets of documents is facsimile transmitted (steps 114, 119, 126 to 128). Finally, the contents of the areas $M_1$ to $M_7$ are cleared (step 186).

In step 175, if the total amount of money which was first paid is less than the charge of one document as well, it is preferable to instruct the user to further pay the shortage of charge by displaying the message indicative of the lack of charge in step 178. In this case, if the user removes the document to stop the facsimile transmission, the processes in step 114 and subsequent steps will not be performed any more.

Although a proper money is first paid by the user by either the card or cash in the embodiment, the charge per one document is calculated and displayed by detecting the size of document and thereafter the payment of the charge may be informed to the user.

The data length may be also used as fundamental data to calculate the charge in place of the data indicative of the size of sheet. The data length can be obtained from the count value of the counter $C_1$ or from the data in the area MC.

Other Embodiments

The above-described embodiments use the charge payment methods whereby the charge is paid by the card in principle and the shortage of charge is paid in cash, or by either one of or both of the card and cash. However, the invention can be also applied to an apparatus in which the charge is paid in only cash.

The dialing to connect the line is automatically performed on the basis of the FAX No. stored in the memory in any of the foregoing embodiments. However, the telephone number (FAX No.) may be also manually dialed by push buttons or by other ways. In such a case, a circuit to detect the FAX No. manually dialed will be needed to calculate the charge.

On the other hand, the facsimile apparatus may be equipped with a character reading apparatus and a character recognizing program, then the FAX No. written at a predetermined location on a document to be facsimile transmitted can be read and automatically dialed.

Although the charge is calculated on the basis of the charge table in the embodiments, the charge may be also calculated on the basis of predetermined arithmetic expressions. Or, it is also possible to adopt the on-line system such that the necessary data is transmitted from the facsimile apparatus to the station to inquire the charge to the station and the charge is calculated in the station and this charge is instructed from the station to the facsimile apparatus.

A key input apparatus to input the size of document, the number of documents and the like may be provided and the charge may be also calculated on the basis of the data key input.

The charging method is not limited to the foregoing methods. Namely, the charge is calculated on the basis of the transmission distance and the amount of data (information) to be transmitted (including the size of document as well) in the foregoing embodiments. However, for example, the charge can be also determined on the basis of only an amount of data to be transmitted irrespective of the transmission distance.

Further, although the facsimile transmission in the foregoing embodiments is of the facsimile transmission system due to only the black and white gradations including no half tone. However, the invention can be also applied to the facsimile apparatuses due to the phototelegraphy and color telegraphy including half tone.

On the other hand, on the reception side, all of the transmitted data may be stored into a buffer and the sheet may be cut by detecting a predetermined continuous length of the white level, and the next black data may be also printed on the next sheet. All of the data may be also recorded on a long roll paper.

What is claimed is:

1. A facsimile transmitting method for use with a facsimile apparatus for reading and transmitting information recorded on a document, comprising the steps of:

automatically calculating a facsimile charge (i) prior to any facsimile transmission of information read from a document to be transmitted and (ii) on the basis of data relating to an amount of information recorded on said document to be transmitted;

receiving a value corresponding to the facsimile charge calculated; and thereafter transmitting information read from the document to be transmitted.

2. A facsimile transmitting method according to claim 1, wherein the value corresponding to the facsimile charge is received as a result of updating value data stored on a value card.

3. A facsimile transmitting method according to claim 1, wherein the value corresponding to the facsimile charge is received as a result of reception of cash.

4. A facsimile apparatus comprising:

means for reading and transmitting information recorded on a document;

means for automatically detecting prior to any facsimile transmission the amount of information recorded on the document to be transmitted; and means for automatically calculating a facsimile charge (i) prior to any facsimile transmission of said information recorded on the document to be transmitted and (ii) on the basis of the detected amount of information recorded on the document to be transmitted.

5. A facsimile apparatus according to claim 4, wherein said means for detecting the amount of information recorded on the document to be transmitted is a means for determining the length of the information read from the document.

6. A facsimile apparatus, comprising:

means for reading and transmitting information recorded on a document;

means for detecting prior to facsimile transmission the amount of information recorded on the document to be transmitted; and means for calculating a facsimile charge prior to facsimile transmission on the basis of the detected amount of information recorded on the document to be transmitted, wherein said means for detecting the amount of information recorded on the document to be transmitted comprises a document size detector or a document size input means, and a document number detecting means or a document number input means.

7. A facsimile apparatus according to claim 4, further comprising means for receiving a value corresponding to the calculated facsimile charge.

8. A facsimile apparatus comprising:

means for automatically calculating a facsimile charge (i) prior to any facsimile transmission of information to be facsimile transmitted and (ii) on the basis of data relating to an amount of said information to be facsimile transmitted;

charge receiving means responsive to a card onto which a value is recorded for reading said value from said card, subtracting a value corresponding to the calculated facsimile charge from said read value, and recording the result of the substraction onto said card;

money receiving means for receiving money prior to any facsimile transmission of said information to be facsimile transmitted corresponding to the calculated facsimile charge; and means, responsive to the receipt of said money by said money receiving means, for transmitting the facsimile information.

9. A facsimile transmitting method for use with a facsimile apparatus for reading and transmitting information recorded on documents, comprising the steps of:

(a) calculating a facsimile charge prior to facsimile transmission for each of a plurality of documents to be transmitted on the basis of data relating to an amount of information recorded on the respective document to be transmitted;

(b) receiving a value greater than the calculated facsimile charge for at least a first one of the documents to be transmitted; and (c) thereafter transmitting information read from said documents as long as the sum of the calculated facsimile charges for the documents from which information has been read and transmitted does not exceed said received value.

10. A transaction performing system, comprising:

receiving means for receiving article data relating to a physical article on which a transaction is to be performed;

input means for inputting transaction data relating to said transaction;

calculating means for calculating a transaction charge on the basis of the article data received by said receiving means and the transaction data input by said input means;

display means for displaying said transaction charge;

receiving means for receiving monetary value corresponding to said transaction charge; and means, responsive to the receipt of said monetary value by said receiving means, for executing said transaction, wherein the physical article is a document, and wherein said transaction to be performed is a transmission of said document.

* * * * *